United States Patent [19]
Nakajima et al.

[11] 3,963,999
[45] June 15, 1976

[54] ULTRA-HIGH-FREQUENCY LEAKY COAXIAL CABLE

[75] Inventors: Iwao Nakajima, Ichihara; Takayoshi Maezawa, Tokyo; Takeshi Fukazawa, Ichihara, all of Japan

[73] Assignee: The Furukawa Electric Co., Ltd., Tokyo, Japan

[22] Filed: May 29, 1975

[21] Appl. No.: 581,872

[52] U.S. Cl. ............................... 333/84 L; 333/96; 343/771
[51] Int. Cl.² ..................... H01P 3/06; H01Q 13/10
[58] Field of Search .............. 333/84 R, 84 L, 97 R, 333/96; 343/770, 771; 174/99 R, 107, 110 PM, 126 CS

[56] References Cited
UNITED STATES PATENTS 3,735,293  5/1973  Breitenbach .................. 333/84 R
3,795,915  3/1974  Yoshida ........................ 333/84 R X

*Primary Examiner*—Paul L. Gensler
*Attorney, Agent, or Firm*—Kemon, Palmer & Estabrook

[57] ABSTRACT

A leaky coaxial cable for use at ultra-high-frequency has, between an outer conductor having slots for the radiation of electromagnetic wave and a protective sheath covering the outer conductor, a dielectric layer with electrically low loss, thereby decreasing the transmission loss. By arranging the slots of the outer conductor in a predetermined relation, it is possible to provide a leaky coaxial cable having a wide band characteristic and less transmission loss.

6 Claims, 11 Drawing Figures

COUPLING LOSS (dB)
A LOW COUPLING LOSS MEANS
A LARGE AMOUNT OF RADIATION

ULTRA-HIGH-FREQUENCY LEAKY COAXIAL CABLE

This invention relates to an ultra-high-frequency leaky coaxial cable for use in a mobile communication.

A leaky coaxial cable has an outer conductor in which slots are arranged at a predetermined pitch. Electromagnetic wave radiating through the slot is distributed along the length of the cable and, therefore, the leaky coaxial cable can be suitably applied in a communication between a mobile station such as a train and a base station such as a railway station. The leaky coaxial cable of this type is used at 150 MHz at most (VHF or very high frequency band) and no problem has been presented from the practical viewpoint. Recently, however, there is a demand for such a leaky coaxial cable to be used at UHF or ultra-high-frequency band. It was found that the leaky coaxial cable, when used at UHF band, involves considerable increase of transmission loss with the consequent impracticability. There is also a demand for such leaky coaxial cable to be used at a wide band, for example, at both 400 MHz and 800 MHz bands. As a means for attaining a wide-band radiation characteristic of a leaky coaxial cable, it has been proposed to sinusoidally vary the excitation strength of the slot in a longitudinal direction of the cable (see U.S. Pat. No. 3,795,915). This provides, however, no sufficient solution to this problem.

A primary object of this invention is to provide a UHF leaky coaxial cable involving less transmission loss.

Another object of this invention is to provide a UHF leaky coaxial cable having a wide band characteristic and less transmission loss.

To attain the primary object of this invention, there is provided a UHF leaky coaxial cable comprising an inner conductor, an insulator disposed on the inner conductor, an outer conductor provided on the insulator in a coaxial relation to the inner conductor and having a plurality of slots formed at a predetermined pitch, and a protective sheath adapted to cover the outer conductor, in which a dielectric layer with electrically low loss is disposed between the outer conductor and the protective sheath.

In another aspect of this invention, the slots consist of main slots and auxiliary slots, and the auxiliary slots are arranged at both sides of the main slot so as to inhibit radiation of unwanted modes of higher order modes.

This invention can be more fully understood from the following detailed description when taken in conjunction with the accompanying drawings, in which.

Figure 1:
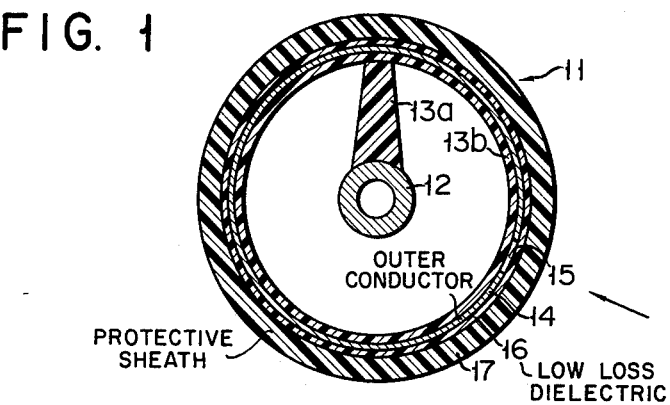
FIG. 1 is a cross-sectional view of a UHF leaky coaxial cable according to one embodiment of this invention.

A great increase, at UHF band, in the transmission loss of a leaky coaxial cable is considered due to the fact that, when such high frequency wave is involved, dielectric loss within a protective sheath covering an outer conductor accounts for a greater proportion of transmission loss. The electromagnetic wave radiated externally from the outer conductor includes a component which, like a surface wave, propagates in the immediate neighborhood of the outer surface of the outer conductor. The amount of attenuation of such component depends on $\tan\delta$ of the protective sheath disposed on the outer conductor. A material for the protective sheath, as found in a common cable, is polyethylene blended with carbon black to provide good weatherability and has great $\tan\delta$ in comparison with that of a pure polyethylene. When such protective sheath is bonded to the outer conductor, the surface wave component or the like of the electromagnetic waves externally radiated from the outer conductor, which propagates in the direction of transmission, is attenuated due to the presence of the protective sheath of larger $\tan\delta$, resulting in increased transmission loss.

To explain more in detail, a phase constant $\beta_n$ of the wave guide, such as a leaky coaxial cable, having a periodically varied structure can be expressed, from the Floquet's theorem, as follows:

$$\beta_n = \beta_0 + 2n\pi/P_o \tag{1}$$

where $\beta_0$: a phase constant where no slot is provided in the outer conductor i.e. where no periodically varied structure is involved.

$P_o$: the pitch of the slot $n$: integer

Electric field produced at point P(Z, r) outside the cable can be expressed—where in a circular cylindrical coordinates, Z denotes a coordinate in the axial direction of the cable and r, a coordinate in the radial direction of the cable—as follows:

$$\vec{E} = -j\omega\mu_o rot\vec{\Pi}m \tag{2}$$

where $j: j^2 = -1$ $\mu_o$: permeability in vacuum $\vec{\Pi}m$: magnetic Hertz's vector The Z direction component of $\vec{\Pi}\tau m$ can be expressed as follows (the other component i.e. the r direction component is zero), provided that $\xi n = k^2 - \beta_n^2$.

$$\vec{\Pi}_{m,z} = \frac{1}{4\omega\mu} \sum_{on=-\infty}^{\infty} J_{mn} e^{-j\beta_n z} H_o^{(1)}(\xi n\ r) \tag{3}$$

where $J_{mn}$: current amplitude of mn component $H_o^{(1)}$: Hankel function of first kind of zero-th order $\xi n$: the radiation angle of electromagnetic wave of n-th mode from the slot k: a phase constant in a free space In equation (3), a surface wave is obtained when $\beta_n > k$. That is, when the surface wave is involved, $\xi n$ is imaginary; the Z direction component of energy is real; and the r direction component is imaginary.

When the energy concentration of the surface wave is computed from equation (3), more than 10% of the energy transmitted by the surface wave is concentrated within a range of 0.2 mm from the surface of the outer conductor, even if $n = 1$ in which the broadening of energy is greatest. When $n = 2, 3, 4 \ldots$, the broadening of energy is rapidly decreased and the extent of energy concentration of the surface wave is further increased. In order to make the attenuation of the surface wave as small as possible, it is required that a dielectric material in contact with the outer surface of the outer conductor be of a type having an electrically low loss.

According to this invention, therefore, a dielectric layer with an electrically low loss is interposed between the outer conductor and the protective sheath.

Figure 2:
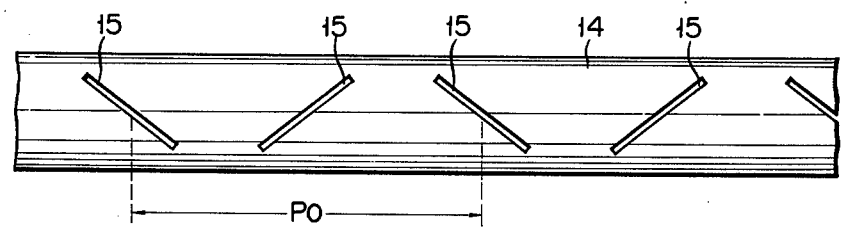
FIG. 2 is a side view, as viewed in a direction indicated by an arrow in FIG. 1, of an exposed outer conductor, on a somewhat reduced scale, of the cable in FIG. 1.

FIGS. 1 and 2 show a UHF leaky coaxial cable 11 according to a practical embodiment of this invention. The coaxial cable 11 includes an inner conductor 12; an insulating band 13a, made of polyethylene etc., helically wound on the periphery of the inner conductor 12; a cylindrical insulating layer 13b formed by extrusion on the periphery of the insulating band 13a; and an outer conductor 14 coaxial with the inner conductor 12. Slots 15 are formed at a predetermined pitch $P_o$ in the outer conductor 14 to permit electromagnetic wave to radiate therethrough. The slots 15 are so arranged that the direction thereof is reversed, for each one-half pitch, in the axial direction of the cable. A dielectric layer 16 with an electrically low loss is formed on the periphery of the outer conductor 14. The dielectric layer 16 is made of, for example, polyethylene. The result of experiments, as will be later described, reveals that the dielectric layer 16 is preferred to have a thickness of more than 0.1 mm. A protective sheath 17 covers the periphery of the dielectric layer 16. As a material for the protective sheath 17, use is made, as in the prior art, of polyethylene etc. blended with carbon black and age resister to provide improved weatherability. Between the outer conductor 14 and the dielectric layer 16 and between the dielectric layer 16 and the protective sheath 17, bond is made to provide a moisture barrier.

Figure 3:
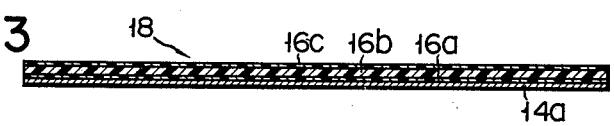
FIG. 3 is a cross-sectional view of a composite tape as applied onto an insulator of the cable in FIG. 1.

A composite tape 18 as shown in FIG. 3 is preferably used in the manufacture of such a leaky coaxial cable.

The composite tape 18 is formed by laminating on an aluminium tape 14a for the outer conductor having slots arranged at a predetermined interval a high-density polyethylene layer 16b with a thin adhesive layer 16a such as ionomer etc. provided in between and further laminating another thin adhesive layer of a low-density polyethylene 16c on the said high-density polyethylene tape 16b. The composite tape 18 is applied lengthwise on the insulating layer 13b with the aluminium tape 14a inside and, then, the protective sheath 17 is extruded on the composite tape 18. At this time, the low density polyethylene tape 16c of the composite tape 18 is fused by heat retained in the extruded sheath and, in consequence, bond is made between the high density polyethylene tape 16b and the protective sheath 17. Since the high density polyethylene has a higher melting point than the low density polyethylene and is not fused by heat of the extrusion, a polyethylene dielectric layer 16 of uniform thickness is formed directly on the outer conductor 14.

As the leaky coaxial cable so constructed has on the outer conductor the dielectric layer with an electrically low loss the attenuation of that surface wave component included in electromagnetic waves radiated externally from the outer conductor and propagated in a transmission direction is greatly reduced, making it possible to greatly alleviate transmission loss.

Comparison is made in characteristics between the leaky coaxial cable, according to this invention, with the low loss dielectric layer and a leaky coaxial cable without the low loss dielectric layer.

1. The cable of this invention used the composite tape as shown in FIG. 3, each part of which had the following thickness:

|  | Cable A (this invention) | Cable B (this invention) | Cable C (this invention) |
|---|---|---|---|
| Aluminum tape 14a | 0.2 mm | 0.2 mm | 0.2 mm |
| Adhesive layer (ionomer) | 0.03 mm | 0.03 mm | 0.03 mm |
| High density polyethylene layer 16b | 0.10 mm | 0.15 mm | 0.20 mm |
| Adhesive layer (low density polyethylene) | 0.02 mm | 0.02 mm | 0.02 mm |

2. The cable for comparison employed a tape in which a 0.03 mm thick adhesive layer (ionomer) was laminated as an adhesive on a 0.2 mm thick aluminium tape for the outer conductor.

Both cables (1) and (2) were 17.3 mm in the outer diameter of the inner conductor and 43 mm in the inner diameter of the outer conductor and were the same in the dimension, inclination angle with respect to the cable axis and pitch of slots as well as in the conditions for lengthwise application of the tape and for extrusion of the protective sheath.

Figure 4:
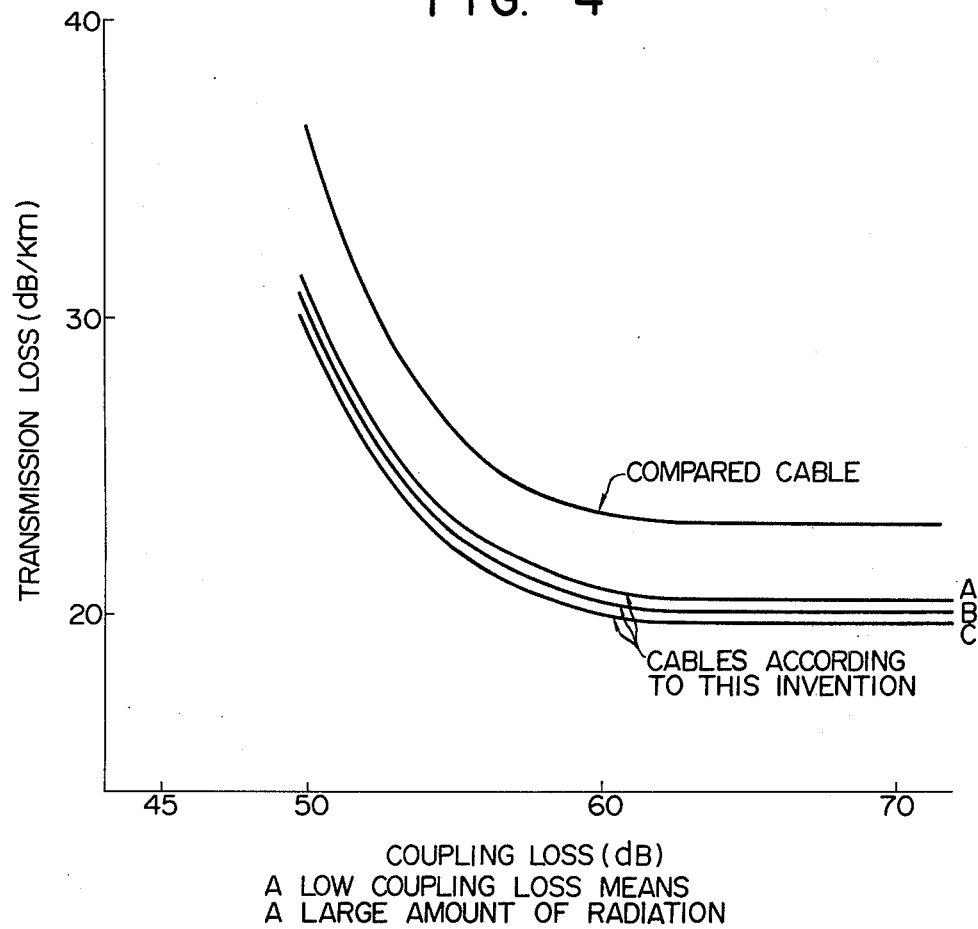
FIG. 4 is a graph showing a transmission loss characteristic of the UHF leaky coaxial cable according to this invention.

The transmission loss of both cables (1) and (2) designed to have the same coupling loss at a frequency of 400 MHz was actually measured, the results of which are shown in FIG. 4. From a graphical representation of FIG. 4 it will be evident that under the same coupling loss the cable (1) of this invention shows much improved transmission loss as compared with the cable (2) used for comparison.

In the leaky coaxial cable as shown in FIGS. 1 and 2 all the slots have the same dimension and inclination angle and, therefore, each slot has the same excitation strength. Consequently, the cable can be used only in narrow band range. If it is used in a wide band range, it radiates unwanted higher order modes and is therefore impracticable. It is accordingly an object of this invention to provide a UHF leaky coaxial cable having a wide band characteristic with small transmission loss.

Figure 5:
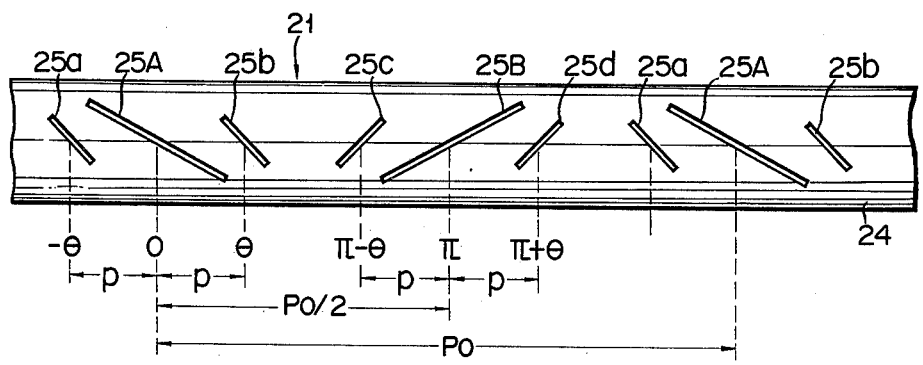
FIG. 5 is a side view of an exposed outer conductor of a UHF leaky coaxial cable according to another embodiment of this invention.

FIG. 5 shows a UHF leaky coaxial cable 21 (the outer conductor is only shown) according to another embodiment of this invention. The cable 21 has main slots 25A, 25B and auxiliary slots 25a, 25b, 25c, and 25d, two of which are provided one at each side of the main slot. The main slots are so arranged that the direction thereof is reversed for each one-half the pitch $P_o$. The auxiliary slot serves to inhibit the radiation of unwanted modes, thereby attaining a wide band leaky coaxial cable. To make the auxiliary slot have the function of inhibiting the unnecessary mode, the following relation should be satisfied with respect to a distance p between the main and auxiliary slots, excitation strength $a_o$ of the main slot and excitation strength $a_1$ of the auxiliary slot:

$$a_1 = \frac{-a_o}{2\cos\frac{6\pi p}{P_o}} \qquad (4)$$

If the relation is so satisfied, a wide band leaky coaxial cable can be attained, the reason of which will be explained more in detail below.

Figure 6:
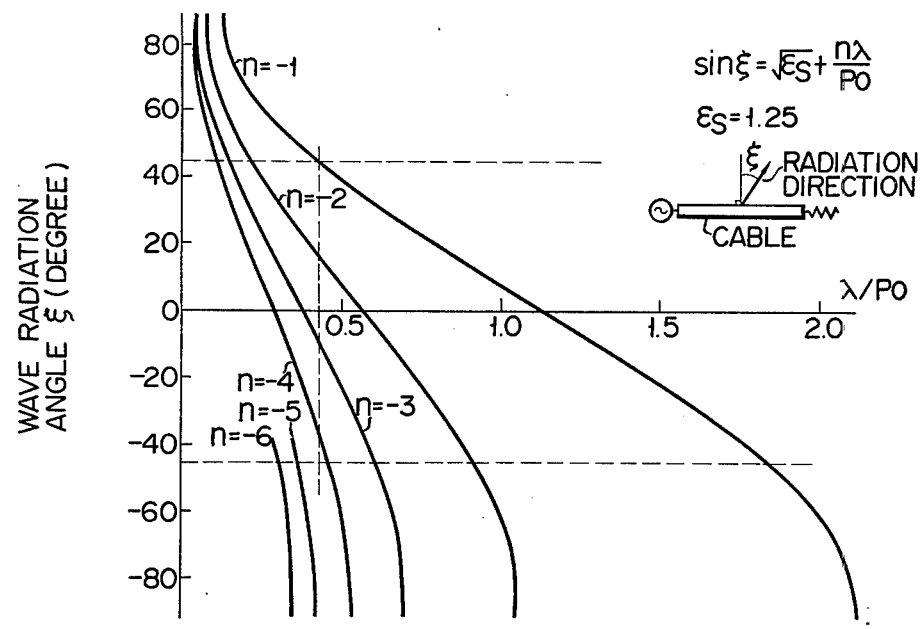
FIG. 6 is a graph showing the frequency characteristic of an electromagnetic wave radiation angle of a leaky coaxial cable.

The phase constant of a wave guide, such as a leaky coaxial cable, having a periodically varied structure can be derived, as shown in the above-mentioned equation (1), from the Floquet's theorem. In equation (1), n can take a variety of values and the phase constant of the wave guide can be determined by $n$. Each $\beta_n$ corresponds to one mode and, at $n < 0$, a radiating wave is obtained. With $\epsilon_s$ representing an equivalent specific dielectric constant, a radiation angle $\xi$ of electromagnetic wave can be determined from the equation, $\sin\xi = \sqrt{\epsilon_s} + n\lambda/P_o$, and the radiation angle of each mode will be as shown in FIG. 6. From a graphic representation of FIG. 6 it will be noted that the radiation angle varies dependent upon the frequency. From the practical viewpoint the leaky coaxial cable is used preferably within a radiation angle range of $-45° < \xi < 45°$ as shown by two horizontal broken lines in FIG. 6. In actual practice it is generally used within this range. The vertical broken line in FIG. 6 represents a lower limit of $\lambda/P_o$ defined by the radiation angle range for the mode of $n = -1$. With the radiation angle so determined within this range, modes of $n = -2$, $n = -3$ and $n = -4$, in addition to a mode of $n = -1$, are also generated. A "band broadening" is intended to mean that the modes of $n = -2$, $n = -3$ and $n = -4$ are eliminated with only the $n = -1$ mode left. It is, therefore, necessary to provide within one pitch of the main slot the auxiliary slot designed to eliminate the unwanted modes of $n = -2$ to $-4$. With An denoting the amplitude of a radiation electric field corresponding to each n, it can be expressed as follows:

$$An = K \sum_{k=1}^{N} a_k e^{-j\frac{2n\pi}{P_o}x_k} \qquad (5)$$

in which:
K: a constant
N: the number of slots within one pitch
$a_k$: the excitation strength of the kth slot
$x_k$: a distance between the kth slot and the 0(zero)th slot.

Now consider a leaky coaxial cable with slots ($N=6$) arranged in a zigzag fashion. The reason for $N = 6$ is that, where slots are actually formed in the outer conductor, it is only possible to provide at most two auxiliary slots one at each side of the main slot. If, for example, four auxiliary slots are formed two at each side of the main slot, then $N = 10$. With the 10 slots so arranged within one pitch, the interslot distance is shortened, resulting in the reduced mechanical strength of the outer conductor. Furthermore, one slot is overlapped with respect to another, with the resultant impracticability. In order to eliminate unwanted modes n $= -2$ to $n = -4$ when $N = 6$, it is only necessary that the following simultaneous equations as obtained by substituting $N = 6$ in equation (5) be solved.

$$\left.\begin{array}{l} A_{-1} = K \sum_{k=1}^{6} a_k e^{j\theta_k} \neq 0 \qquad \theta_k = \frac{2\pi x_k}{P_o} \\[6pt] A_{-2} = K \sum_{k=1}^{6} a_k e^{2j\theta_k} = 0 \\[6pt] A_{-3} = K \sum_{k=1}^{6} a_k e^{3j\theta_k} = 0 \\[6pt] A_{-4} = K \sum_{k=1}^{6} a_k e^{4j\theta_k} = 0 \end{array}\right\} \quad (6)$$

When, for ease of understanding, the slot pitch $P_o$ is made to correspond to the angle $2\pi$ and the distance p between a main slot and an adjacent auxiliary slot to correspond to angle $\theta$, the following equation (7) can be obtained.

$$\frac{\theta}{p} = \frac{2\pi}{P_o} \qquad (7)$$

The relation as expressed in equation (7) is shown in FIG. 5. Based on this relation, equation (6) can be solved, as follows, with respect to $n = -1$ to $n = -4$.

1. $n = -1$

Figure 7:
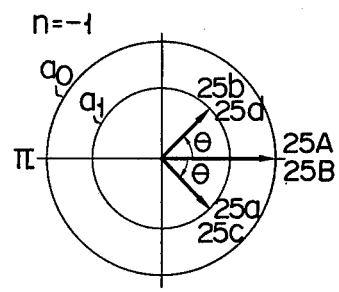
FIGS. 7 to 10 are vector diagrams each showing the phase of radiation of each slot of the leaky coaxial cable according to this invention.

With a main slot 25A taken as a reference, the phase differences of the other slots 25a, 25b, 25c, 25B and 25d as measured from the position of the main slot 25A are $-\theta$, $\theta$, $\pi$, $\pi-\theta$, $\pi$ and $\pi+\theta$, respectively. Taking into consideration the fact that the slots 25c, 25B and 25d are reversed in direction with respect to the main slot 25A, the excitation strength of the respective slots 25A, 25B, 25a, 25b, 25c and 25d can be vectorially represented as in FIG. 7. Since the vector sum is not zero, the requirement in equation (6) of $A_{-1} \neq 0$ is already satisfied.

2. $n = -2, -4$

Figure 8:
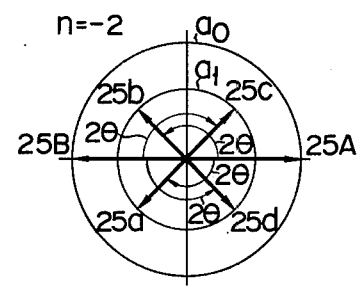
Figure 9:
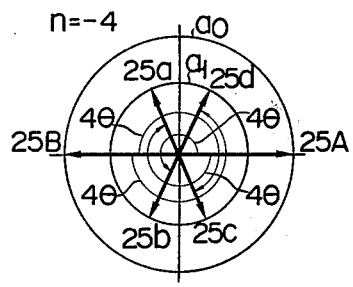

In these cases, the excitation strength of each slot can be vectorially represented as in FIGS. 8 and 9. In either case, the vector sum becomes zero and, in consequence, the respective requirements $A_{-2} = 0$, $A_{-4} = 0$ are satisfied in equation (6).

3. $n = -3$

Figure 10:
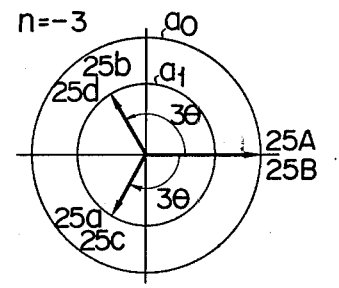

The radiation strength of each slot can be vectorially represented as in FIG. 10. Since, in this case, the vector sum does not generally become zero, $a_1$ and $\theta$ must be so selected as to make the vector sum come to zero. That is, $$A_{-3} = 2[\{a_o + a_1\cos3\theta + a_1\cos(-3\theta)\} + \{a_1\sin3\theta + a_1\sin(-3\theta)\}j] = 0 \qquad (8)$$

Thus, $$a_o + 2a_1\cos3\theta = 0 \qquad (9)$$
$$a_1\sin3\theta + a_1\sin(-3\theta) = 0 \qquad (10)$$

Equation (10) is of no particular significance, since it is an idenity. Solving equation (9), $$a_1 = \frac{-a_0}{2\cos 3\theta} \quad (11)$$

Substituting the value of $\theta$ in equation (7) into equation (11).

$$a_1 = \frac{a_0}{2\cos \theta \frac{6\pi p}{P_o}} \quad (12)$$

This represents a necessary and sufficient condition for the wide band leaky coaxial cable.

Figure 11:
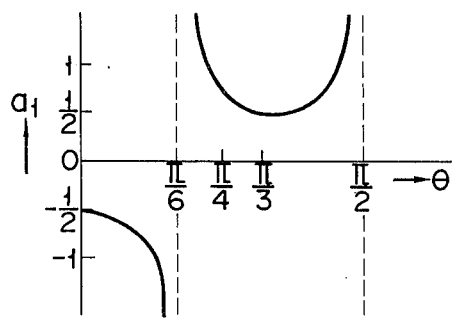
FIG. 11 is a graph showing the excitation strength of auxiliary slots in an outer conductor of the leaky coaxial cable according to this invention.

Equation (12) can be graphically represented as in FIG. 11. As will be appreciated from FIG. 11, where the auxiliary slot is formed at a location $\pi/6$ to $\pi/2$ apart from the main slot, it is necessary to arrange the auxiliary slot at the same direction of inclination as that of the main slot. Where, on the other hand, the auxiliary slot is formed within a range between 0 to $\pi/6$ as measured from the main slot, the inclination direction of the auxiliary slot must be reversed with respect to that of the main slot. As will also be appreciated from FIG. 11, the auxiliary slot must not be formed in a position of $\pi/6$.

Accordingly, the leaky coaxial cable of this invention can be applied in a wide band, as the excitation strength of the auxiliary slot—which is determined by the inclination angle and size of the slot—is so determined according to the distance between the main and auxiliary slots as to inhibit generation of higher order modes.

What we claim is:

1. An ultra-high-frequency leaky coaxial cable comprising an inner conductor, an insulator disposed on the inner conductor, an outer conductor provided on the insulator in a coaxial relation to the inner conductor and having a plurality of slots formed at a predetermined pitch, and a protective sheath adapted to cover the outer conductor, characterized in that a dielectric layer with an electrically low loss is disposed between the outer conductor and the protective sheath.

2. An ultra-high-frequency leaky coaxial cable according to claim 1, in which said dielectric layer with electrically low loss is made of a material having a higher melting point than that of said protective sheath and bonded at one side to said outer conductor and at the other to said protective sheath.

3. An ultra-high-frequency leaky coaxial cable according to claim 2, in which said dielectric layer with electrically low loss is made of a high density polyethylene.

4. An ultra-high-frequency leaky coaxial cable according to claim 1, in which said dielectric layer with electrically low loss has a thickness of more than 0.1 mm.

5. An ultra-high-frequency leaky coaxial cable according to claim 2, in which said dielectric layer with electrically low loss has a thickness of more than 0.1 mm.

6. An ultra-high-frequency leaky coaxial cable according to claim 1, in which said slots consist of main slots and auxiliary slots, said main slots being arranged in the longitudinal direction of the cable with the inclination direction thereof reversed for each one-half pitch and being included two at each one pitch, said auxiliary slots being arranged one at each side of each main slot, and satisfy the following relation:

$$a_1 = \frac{-a_0}{2\cos \frac{6\pi p}{P_o}}$$

where:
P: a distance between the main and auxiliary slots,
$a_0$: the excitation strength of the main slot,
$a_1$: the excitation strength of the auxiliary slot, and
$P_o$: the pitch of the main slot.

\* \* \* \* \*